United States Patent [19]
Hall

[11] Patent Number: 5,180,344
[45] Date of Patent: Jan. 19, 1993

[54] MOTORIZED PULLEY WITH INTERNAL MOUNTS

[75] Inventor: David V. Hall, Wilmington, N.C.

[73] Assignee: Interroll Holding A.G., San Antonio, Switzerland

[21] Appl. No.: 856,376

[22] Filed: Mar. 23, 1992

[51] Int. Cl.$^5$ ............................................. F16H 7/00
[52] U.S. Cl. ................................................. 474/148
[58] Field of Search ................ 474/148, 167; 198/864, 198/832, 844.1, 860.1, 348

[56] References Cited

U.S. PATENT DOCUMENTS 2,847,114  8/1958  Orr .................................... 474/167 X
3,193,087  7/1965  Hahn ................................. 474/148 X Primary Examiner—Thuy M. Bui
Attorney, Agent, or Firm—Rhodes, Coats & Bennett

[57] ABSTRACT

A drive pulley assembly is disclosed for a conveyor belt assembly which permits a reduction in the overall size of the conveyor assembly without any reduction in the size or width of the conveyor belt. The overall width of the conveyor assembly is reduced by providing recessed end cavities in the ends of the drive pulley to accommodate the mounting brackets for the pulley. In accordance with the present invention, the mounting brackets are secured to the inside of respective frame members and extend therefrom into the recessed end cavities of the drive pulley such that substantially the entirety of the mounting bracket lies within the drive pulley. Because the mounting brackets are contained substantially within the confines of the drive pulley, the drive pulley assembly of the present invention requires less space than conventional conveyor assemblies in which the mounts are disposed beyond the ends of the drive pulley.

10 Claims, 3 Drawing Sheets

MOTORIZED PULLEY WITH INTERNAL MOUNTS

BACKGROUND OF THE INVENTION

The present invention relates generally to a drive pulley assembly for a belt-type conveyor, and more particularly to a drive pulley assembly having an internal mounting means for mounting the conveyor pulley to a conveyor frame.

Typically, a belt-type conveyor includes a pair of pulleys or drums rotatably mounted to a frame. A conveyor belt for conveying articles is entrained around the pulleys. Usually, one of the pulleys will be a driven pulley and one will be an idler or non-driven pulley. The driven pulley may include a motor and gear assembly contained inside the pulley so that no external drive is needed. By placing the motor and gear assembly inside the pulley, the relatively large amount of space taken up by conventional external drive arrangements is saved. The reduction in the space requirement results in smaller conveyors without any reduction in the size of the conveyor belt.

Even though the size of a belt conveyor has been significantly reduced in recent years, there is still a great demand for even smaller conveyors. One way to make the conveyor smaller would be to reduce the width of the conveyor belt and pulleys which would result in a corresponding reduction in the overall width of the conveyor assembly. However, this solution is at best a compromise, since the throughput of the conveyor is diminished. It would be far more desirable to reduce the width of the conveyor without any reduction in the width of the conveyor belt.

SUMMARY AND OBJECTS OF THE INVENTION

The present invention is a conveyor assembly having a smaller overall width than conventional conveyor assemblies without any reduction in the size or width of the conveyor belt. The conveyor assembly includes a frame having a driven pulley and an idler pulley mounted at opposite ends thereof, and a conveyor belt entrained around the pulleys. The driven pulley is rotatably mounted on a stationary shaft which extends axially through the pulley. The terminal ends of the stationary shaft terminate inwardly from the ends of the pulley so that the shaft does not extend beyond the end of the pulley. A special mounting bracket is designed to mount on the inside of the conveyor frame, and extends into the open end of the conveyor pulley to support the mounting shaft. Because substantially the entirety of the mounting bracket is contained within the confines of the pulley itself (there being approximately a ⅛ inch gap between the end of the pulley and the conveyor frame), the overall width of the conveyor assembly is reduced.

Based on the foregoing, it is a primary object of the present invention to provide a conveyor assembly having a smaller overall width than conventional conveyor assemblies without any reduction in the size or width of the conveyor belt itself.

Another object of the present invention is to provide a drive pulley assembly for driving conveyor belts in which the mounting means for the drive pulley assembly is contained almost wholly within the pulley.

Other objects and advantages of the present invention will become apparent and obvious from a study of the following description and the accompanying drawings which are merely illustrative of such invention.

DETAILED DESCRIPTION OF THE INVENTION

Figure 1:
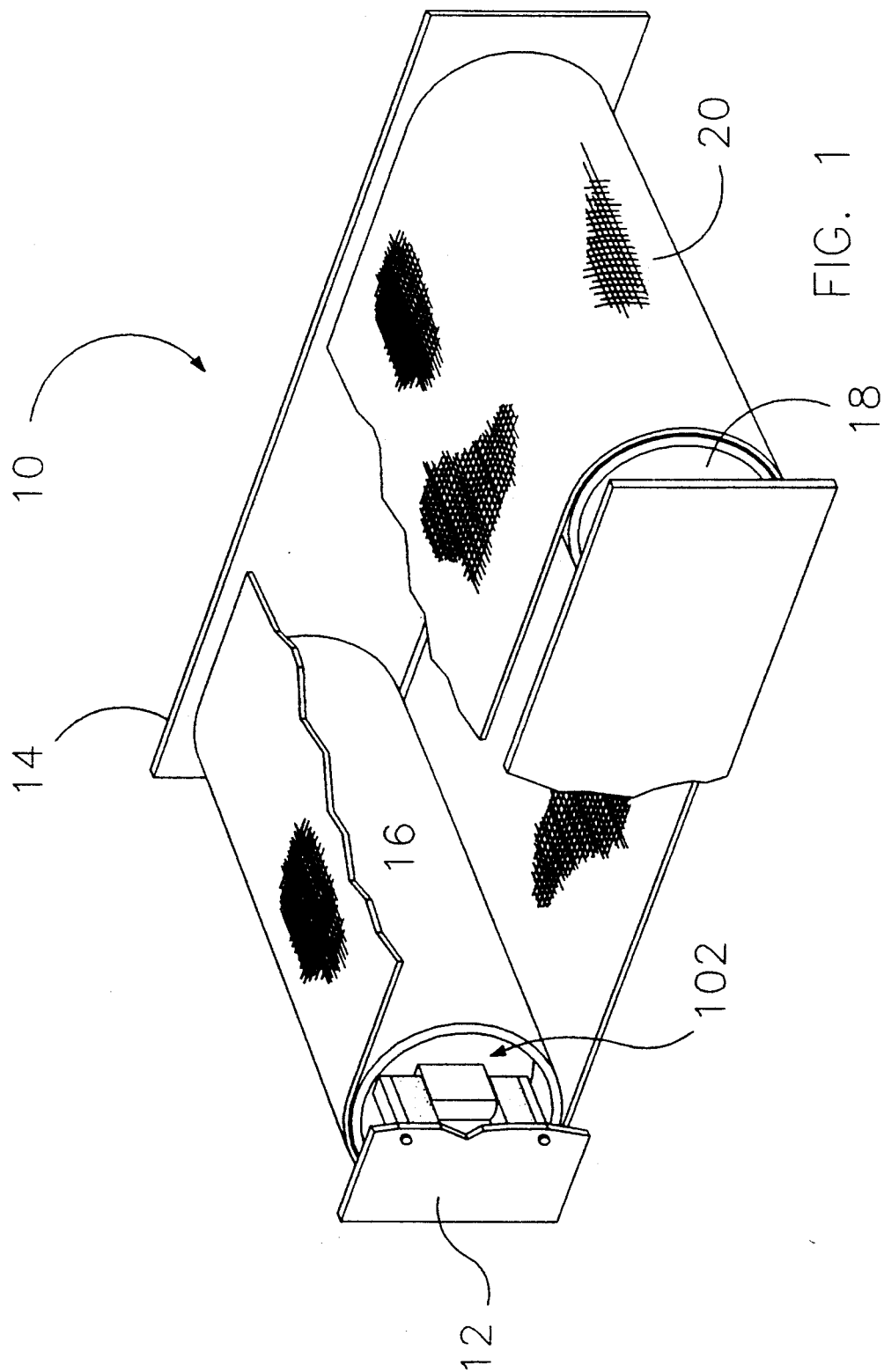
FIG. 1 is a schematic perspective view of a conveyor assembly.
Figure 2:
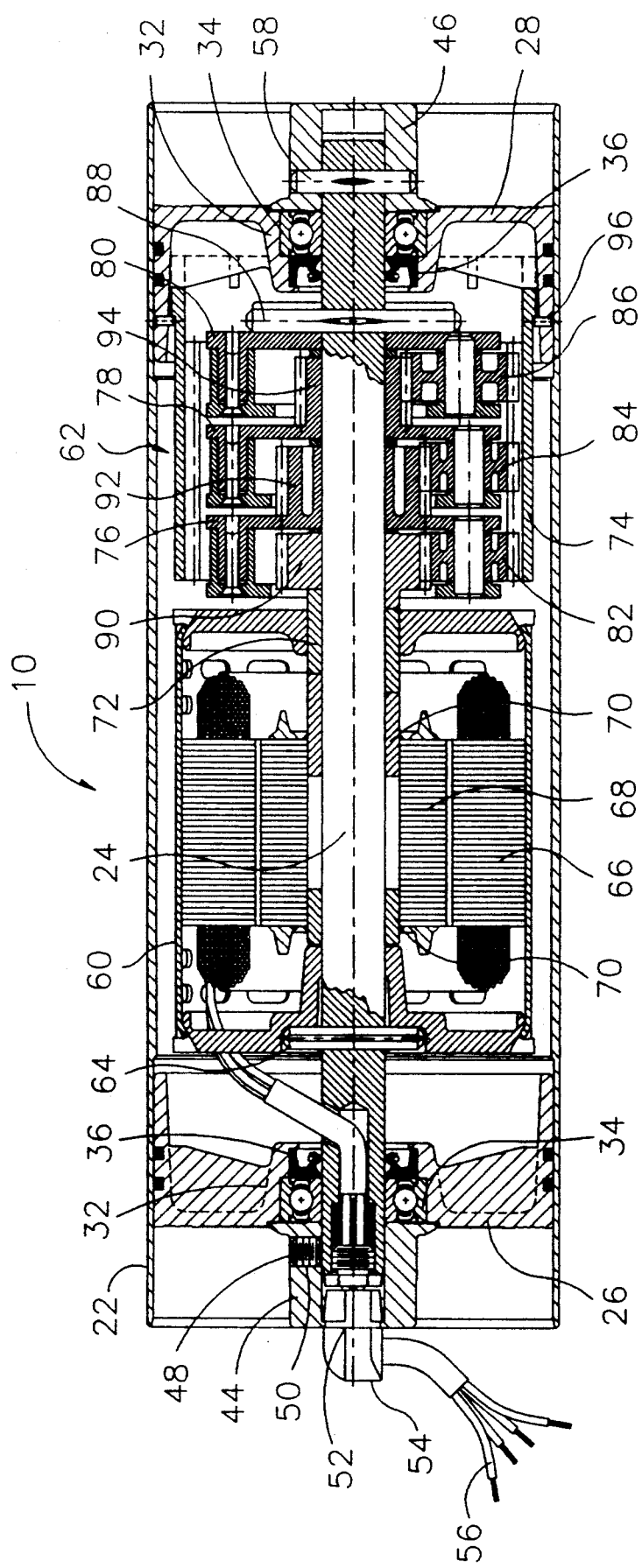
FIG. 2 is a longitudinal section view of the drive pulley assembly of the present invention.
Figure 4:
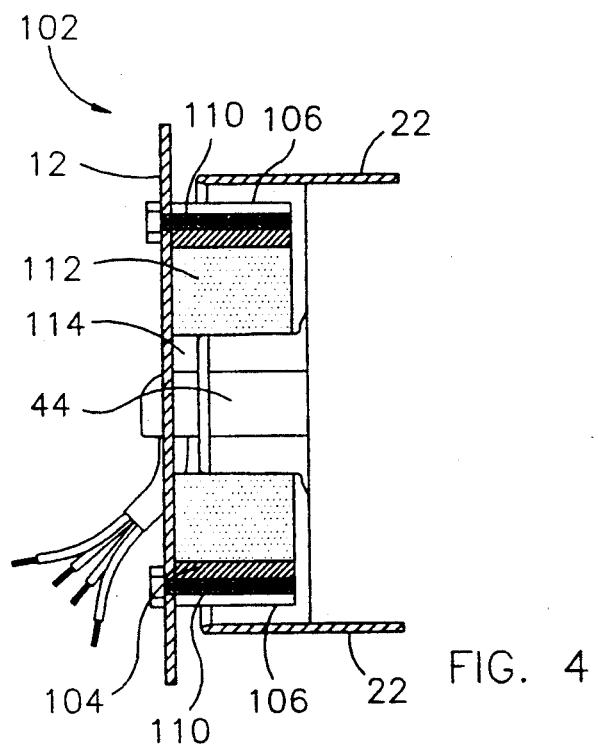
FIG. 4 is a partial longitudinal section view showing the mounting assembly.

Referring now to the drawings, and more particularly to FIG. 1, there is shown a conveyor belt assembly indicated generally at 10 embodying the present invention. The conveyor belt assembly includes a pair of generally parallel frame members 12 and 14, a motorized drive pulley 16 disposed at one end of the frame members, an idler pulley 18 is mounted to the inside of the frame members 12 and 14, and a conveyor belt 20. An idler pulley or non-driven pulley is provided at the opposite end of the conveyor.

The drive pulley 16 includes a generally cylindrical drum 22 which is rotatively mounted on a stationary main shaft 24 by flanged endcaps 26 and 28. The endcaps 26 and 28 are press-fit into respective ends of the drum 22 and are recessed from the ends of the drum 22. The endcaps 26 and 28 include a central hub 32 which contains and anti-friction bearing 34 and seal 36. The main shaft 24 extends through the central hub 32 of each endcaps 26 and 28 and terminates inwardly of the end of the drum 22. Shaft caps 44 and 46 are mounted on respective terminal ends of the main shaft 24. The shaft caps 44 and 46 function as an adapter for mounting the pulley to the frame members 12 and 14 as will be hereinafter described. Shaft cap 44 is secured to one end of the main shaft 24 by means of a set screw 48 extending through a radial opening 50 in the shaft cap 44. The opposite shaft cap 46 is secured to the end of the main shaft by means of a securing pin 58.

The end caps 26 and 28 define a closed compartment within the drum 22 for containing the motor 60 and gear assembly 62. The motor 60 is fixed against rotation on the main shaft 24 by a pin 64. The motor 60 is a conventional AC motor including a stator 66 and rotor 68. The rotor 68 rotates about the main shaft 24 on bushings 70. The motor output shaft 72 is engaged with the rotor bushings 70. The motor output shaft 72 is connected to the gear assembly 62, which in turn rotates the drum 22 about the main shaft 24. Power to the electric motor is provided by a power cord 56 which extends through an axial bore 96 in one end of the main shaft 24. The electrical wires 56 pass through a compression seal 98 which is fitted into the axial bore 96 and retained there by a compression screw 100. An opening 52 is formed in the end of the shaft cap 44 which received a 90° fitting 54. The electrical wires 56 extend through the fitting 54 and are connected to an AC power source (not shown).

Referring now to the gear assembly 62, it includes a three-stage planetary gear connected between the motor output shaft 72 and the drum 22. The gear assembly 62 includes a ring gear 74 which is fixed in relation to the drum 22 by pins 96. The gear assembly 62 also has three gear carriers 76, 78 and 80 (one for each stage) which are retained on the main shaft 24 by a securing pin 88. The gear carriers 76 and 78 freely rotate about the shaft 24. Gear carrier 80 is fixed to the main shaft 24. Each gear carrier 76, 78 and 80 carries three equally spaced planetary gears which are indicated at 82, 84 and 86. The planetary gears 82, 84 and 86 are rotatively mounted on their respective carriers and are meshed with the ring gear 74. A first pinion gear 90 is rotatively mounted on the main shaft 24 and is driven by the motor output shaft 72. The first pinion gear 90 meshes with the first stage planetary gears 82. Thus, rotation of the first pinion gear causes the planetary gears 82 to revolve around the pinion gear 90 and rotates the gear carrier 76. The first stage gear carrier 76 includes an integrally formed pinion gear 92 which meshes with the second stage planetary gears 84. Thus, as the gear carrier 76 rotates about the main shaft 24, the second stage planetary gears 84 tend to revolve about the main shaft 24 and rotates the second stage gear carrier 78. The second stage gear carrier 78 includes an integrally formed pinion gear 94 which meshes with the planetary gears 86 carried by the third stage carrier 80. Rotation of the second stage gear carrier 78 causes the planetary gears 86 to rotate. However, since the final gear carrier 80 is fixed to the main shaft 24, the third stage planetary gears do not revolve, but instead rotate in place causing the ring gear 74 to rotate. As a result, the entire drum 22 is rotated about the main shaft 24.

The drive pulley assembly is mounted between the frame members 12 and 14 by a pair of mounting assemblies indicated generally at 102. The mounting assembly includes a generally rectangular mounting bracket having tabs 106 on the top and bottom thereof. The tabs 106 are provided with screw holes 108 through which the securing screws 110 extend. A resilient support member 112 is inserted into the mounting bracket 104. The resilient support member includes a central opening 114 which is sized and shaped to receive the shaft cap 44. The opening 114 is shaped to prevent rotation of the shaft cap.

Figure 3:
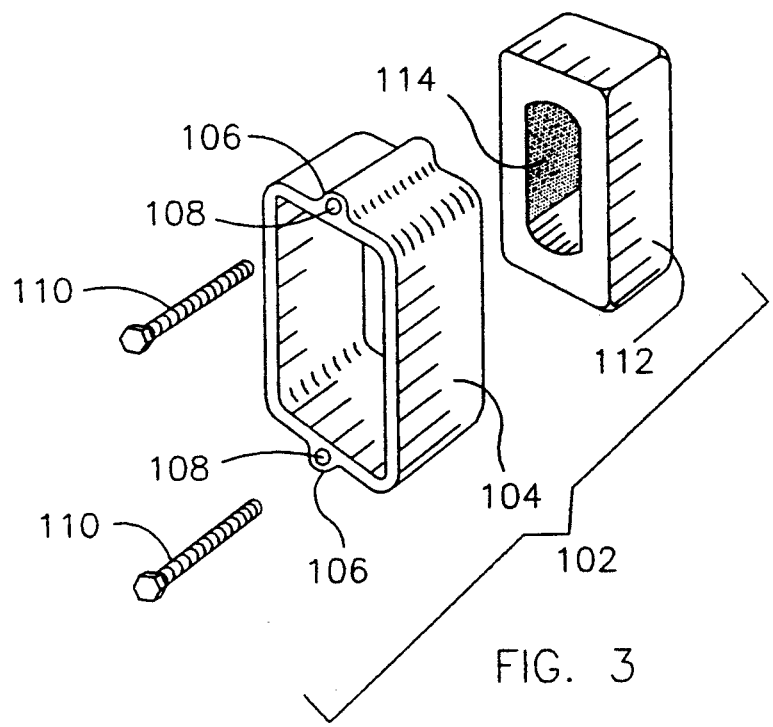
FIG. 3 is a perspective view of the mounting assembly for the drive pulley assembly.

The mounting bracket 104 is mounted to the inside of the frame members 12 and 14 as shown in FIG. 3. The mounting bracket extends from the frame member into the recessed end cavity of the drum 22 such that a substantial majority of the mounting bracket is contained within the drum. The only portion of the mounting assembly 102 not is contained within the drum is that portion which lies in the gap between the end of the drum 22 and the frame members 12 and 14. This gap may be as little as ⅛ of an inch. By allowing the mounting assembly to extend into the recessed end cavities of the drum 22, the overall width of the conveyor can be significantly reduced.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

I claim:

1. A drive pulley assembly comprising:
   (a) a stationary shaft;
   (b) a generally cylindrical drum having two open ends mounted on the stationary shaft for rotation around the axis of the shaft;
   (c) drive means mounted on the stationary shaft and disposed inside the cylindrical drum for rotating the drum around the stationary shaft; and
   (d) a pair of mounting brackets for mounting the drive pulley assembly between a pair of parallel frame members, said mounting brackets being so sized and shaped to fit inside the open ends of the drum such that a substantial majority of the mounting bracket is contained inside the ends of the drum when the drum is mounted between the frame members.

2. The drive pulley assembly of claim 1 wherein the mounting brackets include a resilient shaft support member for engaging the stationary shaft.

3. The drive pulley assembly of claim 1 wherein the ends of the stationary shaft terminate inwardly from the ends of the drum.

4. The drive pulley assembly of claim 1 further including a pair of end caps mounted inside the drum a predetermined distance from the end of the drum, said end caps defining a closed central compartment which contains the drive assembly, and a pair of recessed end cavities for receiving the mounting brackets.

5. A drive pulley assembly comprising:
   (a) a generally cylindrical drum having two open ends;
   (b) a pair of end caps disposed inside the drum a predetermined distance from the open ends, said end caps defining a closed central compartment and a pair of recessed end cavities at each end of the drum;
   (c) a stationary shaft extending axially through the drum, said drum being rotatably mounted on the stationary shaft;
   (d) drive means connected to the stationary shaft and disposed within the central compartment of the drum for rotating the drum around the stationary shaft; and
   (e) a pair of mounting brackets contained substantially entirely within the recessed end cavities of the drum for engaging the ends of the stationary shaft and supporting the drum.

6. The drive pulley assembly of claim 5 wherein the mounting brackets include a resilient shaft support member for engaging the stationary shaft.

7. A conveyor assembly comprising:
   (a) a frame having two generally parallel frame members;
   (b) a drive pulley assembly including:
      (1) a generally cylindrical drum having two open ends;
      (2) a stationary shaft extending axially through the drum, said drum being rotatably mounted on the shaft; and
      (3) drive means connected to the shaft and disposed inside the drum for rotating the drum around the shaft;
   (c) a pair of mounting brackets for mounting the drive pulley assembly between the frame members at one end of the conveyor frame, said mounting brackets being secured to the inside of the frame members and extending therefrom into the open ends of the drum such that substantially the entirety of the mounting brackets are disposed within the drum;
   (d) an idler pulley mounted between the frame members at the end of the frame opposite the drive pulley assembly; and (e) a conveyor belt entrained around the drive pulley and idler pulley.

8. The drive pulley assembly of claim 7 wherein the mounting brackets include a resilient shaft support member for engaging the stationary shaft.

9. The drive pulley assembly of claim 7 wherein the ends of the stationary shaft terminate inwardly from the ends of the drum.

10. The drive pulley assembly of claim 7 further including a pair of end caps mounted inside the drum a predetermined distance from the end of the drum, said end caps defining a closed central compartment which contains the drive assembly, and a pair of recessed end cavities for receiving the mounting brackets.

* * * * *